US009368140B2

(12) United States Patent
Tsuda et al.

(10) Patent No.: US 9,368,140 B2
(45) Date of Patent: Jun. 14, 2016

(54) ACTUATOR ASSEMBLY AND ROTATING DISK STORAGE DEVICE WITH EFFICIENT VOICE COIL SHAPE

(75) Inventors: Shingo Tsuda, Kanagawa (JP); Kenji Suzuki, Ibaragi (JP)

(73) Assignee: HGST Netherlands B.V., Amsterdam (NL)

( * ) Notice: Subject to any disclaimer, the term of this patent is extended or adjusted under 35 U.S.C. 154(b) by 2371 days.

(21) Appl. No.: 11/046,323

(22) Filed: Jan. 27, 2005

(65) Prior Publication Data

US 2005/0162782 A1 Jul. 28, 2005

(30) Foreign Application Priority Data

Jan. 28, 2004 (JP) .................................. 2004-20122

(51) Int. Cl.
*G11B 5/55* (2006.01)
*G11B 5/48* (2006.01)
*G11B 5/54* (2006.01)

(52) U.S. Cl.
CPC ............ *G11B 5/5526* (2013.01); *G11B 5/4806* (2013.01); *G11B 5/54* (2013.01)

(58) Field of Classification Search
USPC ........................................................ 360/264
See application file for complete search history.

(56) References Cited

U.S. PATENT DOCUMENTS

| 5,295,031 | A | 3/1994 | Wasson |
| 5,448,436 | A | 9/1995 | Albrecht |
| 6,225,712 | B1 * | 5/2001 | Miyamoto et al. .............. 310/15 |
| 6,229,663 | B1 | 5/2001 | Yoneda et al. |
| 6,392,845 | B1 | 5/2002 | Tsuda et al. |
| 6,633,457 | B1 | 10/2003 | Lin et al. |
| 6,816,343 | B1 * | 11/2004 | Oveyssi ......................... 360/265 |
| 7,088,556 | B1 * | 8/2006 | Fu et al. ...................... 360/264.7 |
| 2002/0075593 | A1 | 6/2002 | Ultican et al. |
| 2002/0097527 | A1 * | 7/2002 | Chang ......................... 360/264.7 |
| 2005/0036241 | A1 * | 2/2005 | Tsuda et al. ................... 360/264 |
| 2007/0253114 | A1 * | 11/2007 | Fujimoto et al. ............... 360/264 |

FOREIGN PATENT DOCUMENTS

| JP | 07-213042 | 8/1995 |
| JP | 10-003761 A | 1/1998 |

\* cited by examiner

*Primary Examiner* — David D Davis (57) ABSTRACT

Embodiments of the invention provide an actuator head suspension assembly having an efficient voice coil. In one embodiment, a voice coil is formed in a circular or any other shape than the conventional sectorial shape to increase the efficiency of the voice coil and diminish oscillation and noise of an actuator head suspension assembly. The voice coil shape is selected such that the proportion of an out-of-plane force becomes smaller than that in the conventional sectorial voice coil and the proportion contributing as weight to the oscillation energy also becomes smaller.

2 Claims, 8 Drawing Sheets

ACTUATOR ASSEMBLY AND ROTATING DISK STORAGE DEVICE WITH EFFICIENT VOICE COIL SHAPE

CROSS-REFERENCES TO RELATED APPLICATIONS

This application claims priority from Japanese Patent Application No. JP2004-20122, filed Jan. 28, 2004, the entire disclosure of which is incorporated herein by reference.

BACKGROUND OF THE INVENTION

The present invention relates to a voice coil of a voice coil motor used in a rotating disk storage device such as a magnetic disk drive or a magneto-optic disk drive, and more particularly to a voice coil which exhibits an excellent performance in a unique shape.

In a magnetic disk drive, a voice coil motor (hereinafter referred to as "VCM") drives an actuator assembly, causing a head to assume a predetermined position on a magnetic disk. The VCM includes a voice coil mounted on an actuator assembly, a voice coil magnet supported by a base, and a voice coil yoke. To improve the operation performance of the actuator assembly it is important for the voice coil to be light-weight and generate a strong rotating torque and not to generate an unnecessary torque.

Figure 1:
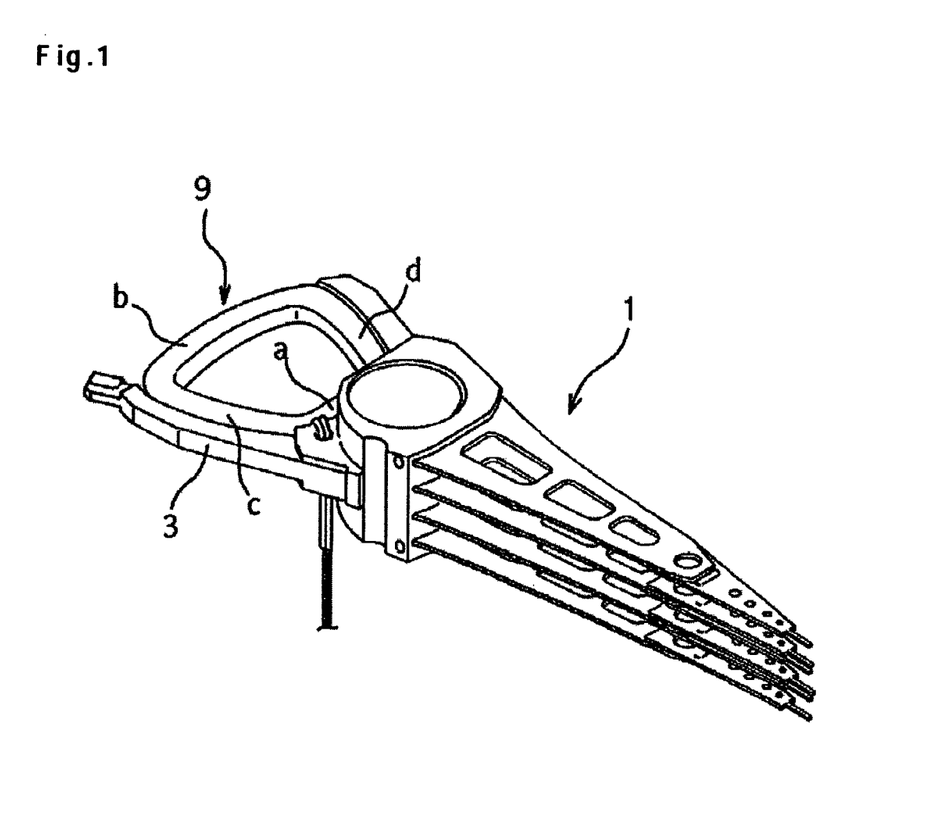
FIG. 1 illustrates the shape of a conventional voice coil.

FIG. 1 is a perspective view showing a conventional actuator head suspension assembly (hereinafter referred to as "AHSA") 1 and a voice coil 9 mounted on the AHSA 1. The voice coil 9 is formed by a continuous conductor winding and is held by a coil support 3. As a plane shape in a coil plane of the voice coil 9, such a generally sectorial shape as shown in FIG. 1 has heretofore been adopted traditionally. When coil portions of the sectorial voice coil are represented by coil sides a to d, the coil side b located far from a pivot shaft of the AHSA 1 is longer than the coil side a close to the AHSA 1. The reason is presumed to be as follows. Even when the voice coil 9 approaches a pivoting limit of the AHSA 1, the coil side d and a part of the coil side c (or the coil side c and a part of the coil side d) are prevented from lying within magnetic fields of the same polarity in a yoke gap formed by the voice coil magnet, whereby it is intended to maintain the torque characteristic for a pivotal position as flat as possible. It is also presumed that the coil sides a and b are disposed outside the yoke gap for the purpose of minimizing the force developed by the voice coil 9 and acting in the pivot shaft direction.

Japanese Patent Laid Open No. Hei 10-3761 discloses a voice coil having a unique shape to diminish oscillation in seeking without affecting a driving torque of a carriage generated by a voice coil motor, thereby improving a magnetic head positioning accuracy and eliminating any bad influence on the durability of a magnetic medium to improve the reliability.

BRIEF SUMMARY OF THE INVENTION

Recently, with an increase in recording density of a magnetic disk, requirements in operation characteristics for AHSA have been becoming more and more strict, such as increase of torque, improvement of acceleration, and decrease of oscillation. It is known that the operation characteristics of AHSA are deteriorated by oscillation of an actuator assembly. Moreover, an out-of-plane force generated by a voice coil will cause oscillation of the actuator assembly. To improve the characteristics of the actuator assembly, it is desirable for a voice coil to be light-weight and generate a strong torque.

Figure 2:
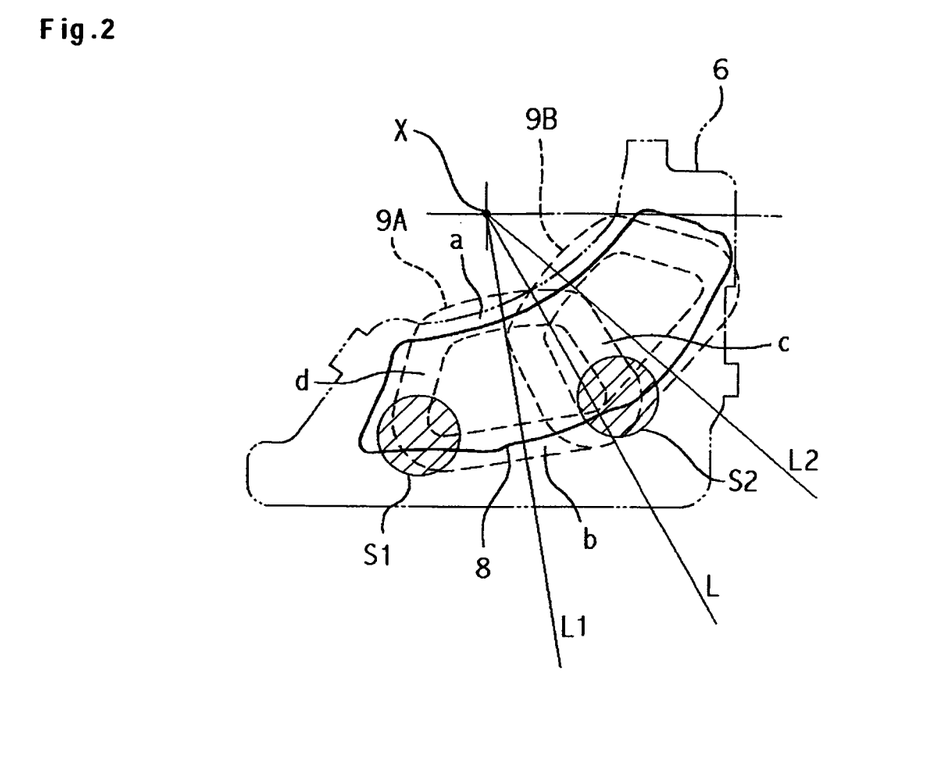
FIG. 2 illustrates a relation between the voice coil shown in FIG. 1 and a voice coil magnet.

FIG. 2 shows a state in which the voice coil 9 illustrated in FIG. 1 pivots within a yoke gap in a voice coil magnetic circuit formed by both voice coil magnet 8 and voice coil yoke 6. In FIG. 2, the voice coil yoke, or an upper yoke, 6 is disposed at a top position and the voice coil magnet 8 is disposed below and in opposition to the upper yoke 6 so as to form a yoke gap. Below the voice coil magnet 8 is disposed a lower yoke (not shown) to form a voice coil magnetic circuit in cooperation with the upper yoke 6 and the voice coil magnet 8. The AHSA 1 is constructed such that the voice coil 9 held by the coil support 3 is disposed in the yoke gap so as to be pivotable about a center X of a pivot shaft.

The voice coil 9 including positions for voice coils 9A and 9B is shown in FIG. 2. The voice coil 9A lies at a position corresponding to a outermost position of the AHSA 1 on a magnetic disk. The voice coil 9B lies at a position corresponding to a position closest to a spindle shaft. The AHSA 1 pivots in the range of between center lines L1 and L2 symmetrically right and left with respect to a center line L. The voice coil magnet 8 has magnetic poles such that the center line L1 side and the center line L2 side with the center line L as a boundary are opposite in polarity with respect to a yoke gap. Therefore, the voice coil 9A lying at the position of the center line L1 is placed in a yoke gap wherein the coil sides c and d are opposite in polarity, and generates a torque in the same direction which is determined by the direction of an electric current flowing in the voice coil. As is apparent from the Fleming's left-hand rule, the coil sides a and b generate forces acting in the direction of the center line L1 mutually oppositely. The thus generated forces cancel each other and a difference between both forces remains as a force in the direction of the center line L1.

For the conventional sectorial voice coil 9, the coil sides a and b do not contribute to the generation of torque for causing a pivotal motion of the AHSA 1. Coil portions as connections between the coil sides c, d and the coil side b, which are shown as areas S1 and S2, respectively, project in the pivoting direction in a coil surface, and are therefore close to an end of the voice coil magnet 8. To increase the torque of the VCM, if an attempt is made to increase the area of the voice coil magnet and thereby increase the rotating torque generated by the sides c and d, the end of the voice coil magnet 8 and the coil portions of the areas S1 and S2 come closer to each other. Since the voice coil 9 generates a rotating torque in only the pivoting direction, it is ideal to utilize only a uniform magnetic field in which magnetic lines of force go in and out perpendicularly to a plane out of magnetic fields included in the yoke gap formed by both voice coil magnet 8 and upper yoke 6.

However, at the end of the voice coil magnet 8, a magnetic flux does not go in and out perpendicularly to the plane of the voice coil magnet 8 and the upper yoke 6, but somewhat swells outwards or tilts, thus possessing a horizontal component. The magnetic flux in this portion is sometimes called a leakage flux. As a result, the coil portions of the areas S1 and S2 act in such a manner that the voice coil 9 generates an out-of-plane force in a direction perpendicular to the coil plane, and exert a torsional force around the center line L on the AHSA 1. The out-of-plane force generates as a combination of forces mainly acting on the coil sides b, c and d including the areas S1 and S2, causing oscillation and noise of the AHSA 1. In particular, the coil portions of the areas S1 and S2 cause a strong torque to be exerted on the AHSA 1 due to the fact that the distance from the center line or from the pivot shaft is great.

If two voice coil magnets whose projection planes overlap each other are disposed in a yoke gap face to face with each other so as to be opposite in polarity and the voice coil 9 is positioned accurately at the center of the yoke gap, an out-of-plane force is not generated because a horizontal component of a magnetic field is not created. However, such a construction is not easy in the fabrication of VCM and the provision of such two voice coil magnets leads to an increase of cost. If sufficiently large voice coil magnet and yoke are used for the voice coil 9 to prevent the voice coil from being influenced by leakage flux, there arises another problem that this construction is restricted by the space, cost and weight of the magnetic disk device concerned. On the other hand, if the voice coil size is made small, the number of windings for obtaining a predetermined torque increases with a consequent increase in coil thickness and the coil current increases with a consequent increase in power loss.

Accordingly, it is a feature of the present invention to provide a rotating disk storage device using a voice coil which is light-weight and efficient. It is another feature of the present invention to provide a rotating disk storage device wherein an out-of-plane force acting in a direction perpendicular to a coil plane is diminished to reduce oscillation and noise.

The present invention has a number of characteristics. A voice coil used in the present invention has in a coil plane thereof a shape such that a coil spacing on a rear end side is equal to or narrower than that on a front end side. According to this shape, such a coil portion as corresponds to the projecting portion formed on the rear end side of the conventional sectorial voice coil is eliminated to diminish an out-of-plane force. Further, the weight of the voice coil is reduced by an amount corresponding to the weight of the projecting portion in the conventional sectorial voice coil to suppress oscillation.

In a first aspect of the present invention there is provided a rotating disk storage device comprising a rotating disk storage medium; an actuator head suspension assembly pivotable about a pivot shaft and having a head mounted thereon, the head being adapted to access the rotating disk storage medium; a voice coil attached to the actuator head suspension assembly, and a voice coil magnet which constitutes a voice coil motor in cooperation with the voice coil. When a coil axis of the voice coil and the voice coil cross each other at an intersecting point A1 close to the pivot shaft and at an intersecting point A1 distant from the pivot shaft, and the distance between intersecting points at which a perpendicular line intersects the voice coil is assumed to be LP, the perpendicular line intersecting the coil axis perpendicularly between the intersecting points A1 and A2, the longest LP lines on a middle point between the intersecting points A1 and A2 or lies between the middle point and the intersecting point.

For example, the voice coil, in a coil plane thereof, may be in such a shape as a circular shape, an elliptic shape, a shape comprising two parallel rectilinear portions and semicircular portions contiguous respectively to ends of the parallel rectilinear portions, a quadrangular or more polygonal shape, or a shape including plural rectilinear portions and plural curved portions connecting the rectilinear portions. Shapes obtained by slightly changing these shapes in the scope not departing from the gist of the present invention are also included in the present invention. The intersecting point between the coil axis or the perpendicular line and the voice coil can be obtained at a position where the coil axis or the perpendicular line intersects the center of the coil width.

In a second aspect of the present invention there is provided a rotating disk storage device comprising a rotating disk storage medium; an actuator head suspension assembly pivotable about a pivot shaft and having a head mounted thereon, the head being adapted to access the rotating disk storage medium; and a voice coil attached to the actuator head suspension assembly. The voice coil has in a coil plane thereof a shape such that a portion thereof close to the pivot shaft is wider in coil spacing than a portion thereof distant from the pivot shaft. When a reference line passing through the center of the actuator head suspension assembly or a reference line passing through the head and the center of the pivot shaft passes through the voice coil, the distance between two intersecting points formed by a perpendicular line perpendicular to those reference lines and the voice coil may be used as a coil spacing. Alternatively, the coil spacing may be set at the distance between two intersecting points formed by a perpendicular line and the voice coil, the perpendicular line connecting the center of gravity of the voice coil with the center of the pivot shaft.

In a third aspect of the present invention there is provided a rotating disk storage device comprising a rotating disk storage medium; an actuator head suspension assembly pivotable about a pivot shaft and having a head mounted thereon, the head being adapted to access the rotating disk storage medium; and a voice coil attached to the actuator head suspension assembly. The voice coil is formed in such a manner that the center of gravity of a lumped mass system of the voice coil lies on the pivot shaft side.

According to the present invention it is possible to provide a rotating disk storage device using a voice coil which is light-weight and efficient. Moreover, it is possible to provide a rotating disk storage device wherein an out-of-plane force of a voice coil and the weight of a projecting portion are decreased to diminish oscillation and noise.

DETAILED DESCRIPTION OF THE INVENTION
MAGNETIC DISK DRIVE

Figure 3:
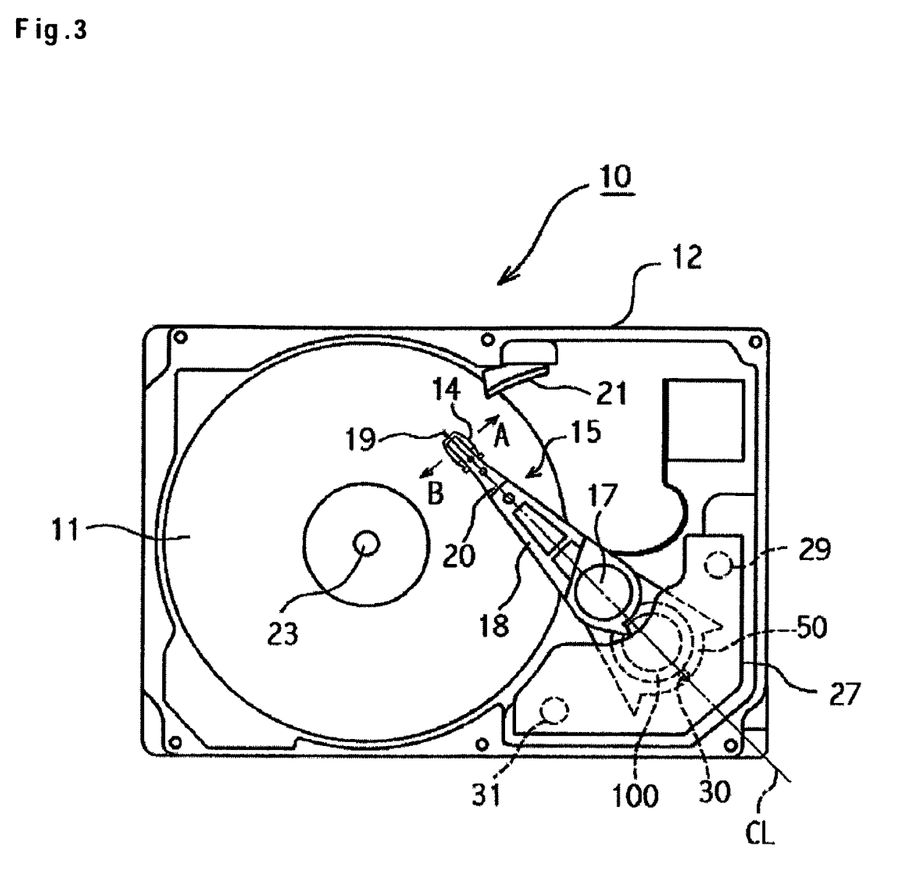
FIG. 3 is a plan view showing a schematic configuration of a magnetic disk drive according to an embodiment of the present invention.
Figure 4:
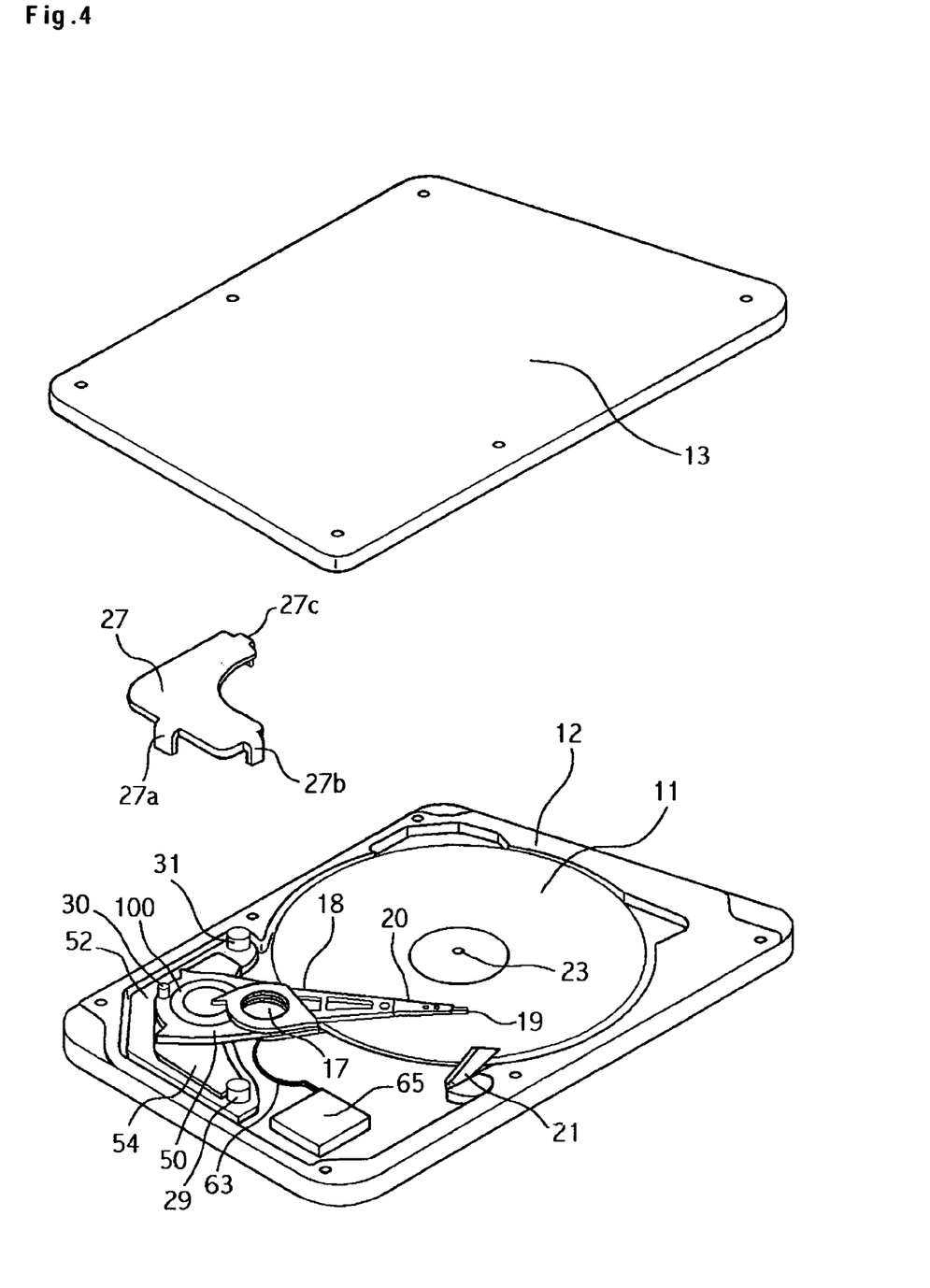
FIG. 4 is an exploded perspective view of the magnetic disk drive shown in FIG. 3.

Referring to FIGS. 3 and 4, a description will be given of a magnetic disk drive embodying the present invention as a rotating disk storage device. In all of the drawings the same components are identified by the same reference numerals. FIG. 3 is a schematic plan view of a magnetic disk drive 10 and FIG. 4 is an exploded perspective view thereof. The magnetic disk drive 10 is covered on the exterior with a disk enclosure base 12 and a disk enclosure cover 13. The base 12 can be formed by die casting of aluminum or by pressing of a steel sheet such as stainless steel sheet.

A magnetic disk 11 as a rotating disk storage medium is provided on at least one side with a recording surface and is attached to a hub adapted to rotate as part of a spindle motor which is disposed below the magnetic disk. The magnetic disk 11 is adapted to rotate about a spindle shaft 23. An AHSA 15 includes a head suspension assembly (HSA) 20, an actuator arm 18, a coil support 50, and a voice coil 100 which is held by the coil support 50. The AHSA 15 is attached to the base 12 through a pivot cartridge so as to be pivotable in directions A and B around a pivot shaft 17. The construction of the AHSA 15 is not limited to the one described in this embodiment, and any other known construction, e.g., a stacked type suspension, may be adopted. In this embodiment, the voice coil 100 has a substantially circular shape in a coil plane thereof. The coil plane as referred to herein indicates a plane constituted in a pivoting direction of the voice coil. Although in this embodiment the coil plane and the surface of the magnetic disk 11 are parallel to each other, it is not always necessary that both be parallel to each other. By the substantially circular shape is meant to include a shape slightly deviated from a true circle due to a manufacturing error and a shape obtained by applying an external force to the voice coil formed as a true circle and thereby causing the voice coil to be slightly deformed. Since the voice coil 100 is formed by plural turns of a conductor winding, it has a coil width in a direction parallel to the coil plane and a coil thickness in a direction perpendicular to the coil plane.

The actuator arm 18, coil support 50, and a pivot cartridge mounting portion (hereinafter referred to as the "pivot bearing housing portion") which constitutes a portion around the pivot shaft, are designated an actuator assembly and are integral with one another in this embodiment. The actuator assembly can be fabricated, for example, by die casting of aluminum or by forming the actuator arm with aluminum, then placing it into a mold for plastic molding together with the voice coil and molding them integrally with the pivot bearing housing portion of a synthetic resin. The HSA 20 includes a load beam attached to the actuator arm 18 and a flexure attached to the load beam. A merge lip 19 or a tab is provided at a front end of the load beam. The flexure supports a head/slider 14 so as to be pivotable.

The head/slider 14 includes a head adapted to read and/or write data with respect to the magnetic disk 11 and a slider carrying the head thereon and adapted to undergo buoyancy from an air flow and thereby fly over the recording surface through a slight gap, the air flow being created on the surface of the magnetic disk which is rotating. The slider is attached to the flexure in such a manner that an air bearing surface (hereinafter referred to as "ABS") is opposed to the recording surface of the magnetic disk 11. The load beam generates a pressure (urging load) in a direction in which the head/slider 14 is urged against the recording surface of the magnetic disk 11. In this embodiment, the HSA 20 and the actuator assembly, i.e., AHSA 15, are formed symmetrically about a center line CL and the voice coil 100 is also formed symmetrically about the center line CL. However, a mode wherein the HSA, the actuator assembly, or the voice coil is deviated from the center line CL and a mode wherein they are asymmetric about the center line CL, are also included in the scope of the present invention.

The coil support 50 which holds the voice coil 100 is formed at a rear end of the AHSA 15. In the coil support 50, a retracting pin 30 as an iron piece formed of a magnetic material may be provided at a position on the center line CL if necessary. It is not always necessary that the retracting pin 30 be positioned exactly on the center line CL. The retracting pin 30 may be positioned near the center line CL. The operation of the retracting pin will be described later together with a ramp 21. An upper yoke 27 is supported by the base 12 so as to cover the voice coil 100. A voice coil magnet 54 is disposed below the voice coil 100 and a lower yoke 52 is disposed below the voice coil magnet 54. The upper yoke 27 and the lower yoke 52 are magnetically connected with each other through legs 27a to 27c of the upper yoke. The upper yoke 27, the voice coil magnet 54 and the lower yoke 52 constitute a voice coil magnetic circuit. An additional voice coil magnet may be provided so as to contact an inner surface of the upper yoke 27, whereby a horizontal component is reduced and a stronger magnetic field can be obtained although an extra space is needed in the vertical direction. The voice coil magnetic circuit and the voice coil 100 constitute a VCM.

The side of the head/slider 14 is designated a front end side or front end portion and the opposite side are designated a rear end side or rear end portion when sides at which parts of the AHSA 15 and VCM are located are referred with respect to the direction of the magnetic disk 10. Magnetic fields in two directions perpendicular to a plane located between the voice coil magnet 54 and the upper yoke 27 are formed in the yoke gap. The voice coil 100 is disposed in the yoke gap so as to be freely movable horizontally. When an electric current flows in the voice coil 100, forces which the respective sides of the voice coil 100 undergo from magnetic fields in different directions are combined and the AHSA 15 pivots in direction A or B about the pivot shaft 17.

By changing the direction and magnitude of the electric current flowing in the voice coil 100 with use of a known servo control technique, the AHSA 15 can be positioned at a desired track position on the magnetic disk 11. To move the AHSA 15 to a desired track in a short time it is necessary to make small a moment of inertia of the AHSA 15 about the pivot shaft 17 and make the VCM torque large. The VCM torque can be made large, for example, by increasing the magnetic flux in the yoke gap, by increasing the number of turns of the voice coil, or by making the electric current in the voice coil large. To increase the magnetic flux in the yoke gap it is necessary to enhance the intensity of magnetization of the voice coil magnet or increase the permeability of the voice coil magnetic circuit, but a limit is encountered in terms of cost, space, and weight.

Increasing the number of turns of the voice coil leads to an increase in weight of the voice coil. To diminish the influence on the operation of the AHSA 15 in the event a horizontal oscillation or shock should be imposed on the magnetic disk 11 from the exterior, the AHSA 15 is generally constructed so that its center of gravity lies on the pivot shaft 17. Therefore, an increase in weight of the voice coil 100 affects the weight balance on the head portion and causes an increase of the entire moment of inertia. Thus a limit is encountered in this regard. Increasing the electric current flowing in the voice coil 100 results in an increase of power loss and thus a limit is encountered. In the present invention, as explained in embodiments thereof which will be described later, those problems will be solved by improving the shape of the voice coil.

An outer crash stop 31 and an inner crash stop 29, which incorporate an elastic material such as rubber therein, are mounted between the upper yoke 27 and the lower yoke 52 so as to stand up from the base 12. The outer crash stop 31 restricts a pivotal movement of the AHSA 15 toward the outside of the magnetic disk 11, while the inner crash stop 29 restricts a pivotal movement of the AHSA 15 toward the spindle shaft 23. A magnet piece for attracting the retracting pin 30 is embedded in the elastic material of the outer crash stop 31. The magnetic disk drive 10 further includes an electronic component 65 and a flexible cable 63 which is used for connecting the head and voice coil 25 with the electronic component 65. A ramp 21 for implementing a load/unload system is provided at an outer position of the magnetic disk 11. When the magnetic disk 11 is not operating, the AHSA 15 allows the merge lip 19 to be engaged onto a rest surface of the ramp 21 and to rest thereon. When the merge lip 19 approaches a predetermined stop position on the ramp 21, the magnet piece of the outer crash stop 31 attracts the retracting pin 30 and defines a stop position for the AHSA 15. When a sectorial voice coil is adopted, the retracting pin 30 is provided at an end of a generally V-shaped coil support. However, in case of a circular voice coil, the shape of the voice coil magnet changes as the shape of the voice coil changes. The retracting pin 30 can be disposed on the center line CL of the coil support or thereabouts to match the change in shape of the voice coil magnet. Of course, it is possible to dispose the retracting pin 30 at an end of the coil support. The present invention is applicable not only to the load/unload system but also to a contact start stop (CSS) system wherein a rest area for the head/slider 14 is provided on the magnetic disk 11.

Voice Coil

Figure 5:
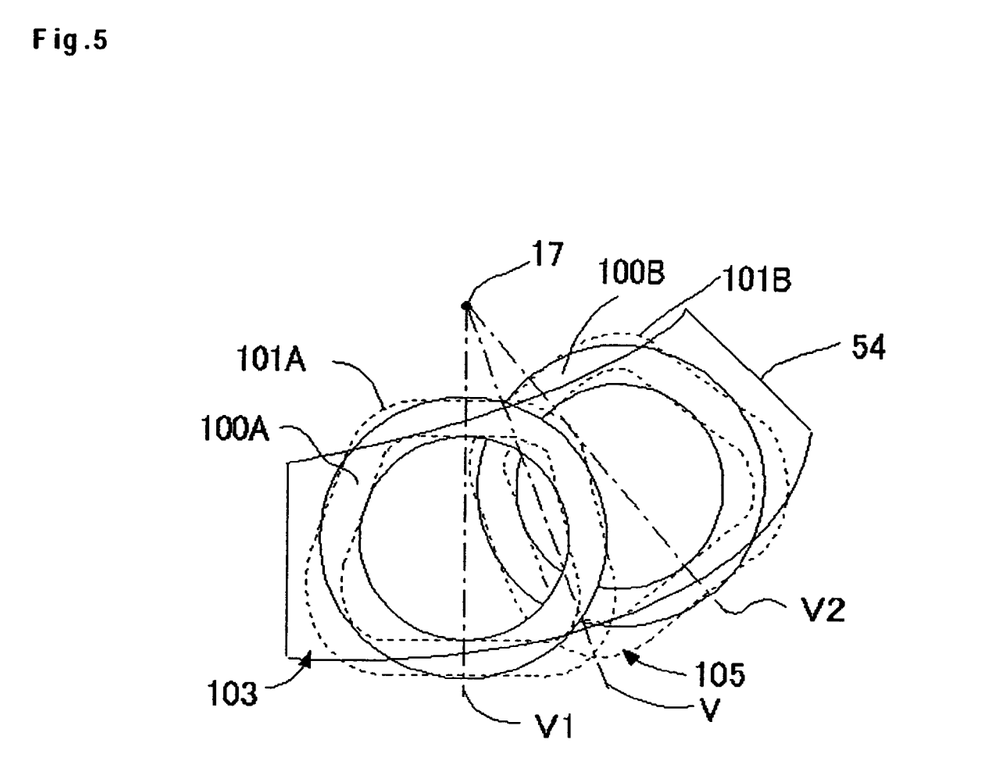
FIG. 5 illustrates the operation of a voice coil used in the embodiment.

FIG. 5 illustrates the operation of the voice coil 100 used in the embodiment. In FIG. 5, a conventional sectorial voice coil 101 is illustrated for explanation in addition to the voice coil 100. The voice coil 100 is denoted by 100A and 100B according to pivotal positions of the AHSA 15. Likewise, the sectorial voice coil 101 is denoted by 101A and 101B according to pivotal positions of the AHSA 15. In FIG. 5, the voice coils 100B and 101B are illustrated as if they were disposed below the voice coils 100A and 101A, but this is for the simplification of illustration. The voice coil 100 is formed in a symmetric shape with respect to the coil axis V which is illustrated as V1 and V2 according to positions of the AHSA 15. The coil axis V1 coincides with the center line CL of the AHSA 15 when the AHSA 15 which pivots about the pivot shaft 17 is in its position of abutment against the outer crash stop 31. The coil axis V2 coincides with the center line CL of the AHSA 15 when the AHSA 15 is in its position of abutment against the inner crash stop 29. The coil axes V1 and V2 lie on lines connecting the center of the pivot shaft 17 with geometrical centers of the voice coils 100A and 100B and are at equal angular positions on the left and right sides about the coil axis V.

The voice coil magnet 54 is disposed below the voice coil 100 and the surface of the voice coil magnet 54 that contacts the yoke gap is magnetized in different polarities for left and right sides of the coil axis V. One magnetic material of the voice coil magnet 54 may be magnetized so that, with a position corresponding to the coil axis V as a boundary, the surface which contacts the yoke gap gradually shifts from one polarity to another. Alternatively, two voice coils of different polarities may be disposed.

A comparison will now be made between the circular voice coil 100 and the sectorial voice coil 101. A first feature resides in that the voice coil 100 does not have such projecting portions 103 and 105 as in the voice coil 101. The projecting portions 103 and 105 are positioned near an outer periphery edge of the voice coil magnet 54 and are strongly influenced by leakage flux from the yoke gap. In particular, when the voice coil magnet 54 is provided on either one of the upper and lower yokes, as compared with the case where it is provided on both yokes, the proportion of a horizontal component in the magnetic flux becomes larger in the peripheral portion of the voice coil magnet 54 and the influence of leakage flux becomes stronger.

The voice coil 100 of this embodiment is formed in a circular shape in the coil plane and the coil portions corresponding to the projecting portions 103 and 105 of the conventional voice coil 101 are spaced away from the peripheral portion of the voice coil magnet, so that the force that will suffer from leakage flux is smaller than in the voice coil 101. Thus, the projecting portions 103 and 105 of the voice coil 101 are influenced by the horizontal component in leakage flux and generate an out-of-plane force in a direction perpendicular to the coil plane. However, an out-of-plane force developed in the voice coil 100 is small.

A second feature of the voice coil 100 is that it has many portions contributing to the generation of torque which causes the AHSA 15 to pivot, in comparison with the voice coil 101. As explained above in connection with FIG. 2, the coil sides a and b of the voice coil 101 constitute wasteful portions not contributing to a rotating torque. On the other hand, in the voice coil 100A, the coil portion positioned on the left side of the coil axis V1 and the coil portion positioned on the right side of the coil axis V contribute to a rotating torque in direction A1, and the coil portion located between the coil axes V1 and V generates a reverse torque acting in direction B1 opposite to direction A1. The same is also true of the voice coil 100B.

At the positions where the outer crash stop and the inner crash stop position are provided, a reverse torque is generated in the voice coil 100. As a result, at a glance the torque efficiency seems to decrease. However, the torque efficiency rises in the whole pivotal range of the AHSA 15. The proportion of the reverse torque of the voice coil 100A becomes smaller as the coil axis V1 pivots toward the coil axis V. Since the circular voice coil does not have such coil portions not contributing to the generation of torque at all as the coil sides a and b shown in FIG. 2, the torque efficiency of the coil portion contributing to the generation of a rotating torque is high. While the AHSA 15 is in normal operation, the frequency of right and left pivoting motions about the coil axis V can be considered high and therefore the influence of the reverse torque poses no problem in practical use. The voice coil 100 can be formed by making a coil around a cylindrical form and is thus easy to fabricate.

Next, the feature of the voice coil 100 will be described quantitatively in comparison with the voice coil 101. To compare two coils different in shape, the comparison is based on the premise that the coils are equal in resistance value and the center of gravity of the AHSA 15 is positioned on the pivot shaft. More specifically, both voice coils are made equal in power consumption for the same electric current and also equal in angular moment provided by the weight from the center of the pivot shaft 17. As a result, in one example, it turned out that an out-of-plane force in the voice coil 100 could be diminished to one third in comparison with the voice coil 101. This leads to a decrease of oscillation caused by the out-of-plane force and improvement in positioning accuracy of the AHSA 15. It also leads to a decrease of noise. That the projecting portions 103 and 105 in the conventional voice coil have been eliminated is the reason why the out-of-plane force could be diminished.

The projecting portions 103 and 105 are distant from the pivot shaft 17 or the coil axis V and act strongly as torque and therefore the shape of the voice coil 100 is effective. This feature is particularly advantageous in that the deterioration in operation performance of the AHSA 15 can be prevented in the voice coil magnetic circuit in which a voice coil magnet is provided on only one side for the reduction of cost. This is because the voice coil magnet provided on one side is high in the proportion of a horizontal component in the peripheral portion.

Then, a comparison was made with respect to the efficiency (Kt/J) of voice coils. Kt stands for a torque constant, corresponding to a torque per unit electric current flowing in a voice coil, and the unit thereof is N·m/A. J stands for a moment of inertia of the AHSA 15. The voice coil efficiency corresponds to the magnitude of acceleration which the AHSA 15 obtained upon flowing of a unit electric current, and the lighter the weight of the AHSA 15 and the higher the voice coil torque, the larger the value and the operation performance is improved. In an example, the efficiency of the voice coil 100 could be improved 25% in comparison with the voice coil 101. More particularly, first, the coil sides a and b shown in FIG. 2 and not contributing to rotation were removed from the voice coil 100 to reduce the weight of the voice coil, whereby the moment of inertia of the voice coil 100 was decreased by 25%. By reducing the weight of the voice coil 100, the front end side of the AHSA 15 could be reduced in weight so that the center of gravity of the AHSA 15 lay in on the pivot shaft 17, and the moment of inertia of the entire AHSA 15 could be diminished by 15%. Under the condition that resistance values are the same, the number of turns of the voice coil 100 could be increased by a proportion of removed portions corresponding to the coil sides a and b shown in FIG. 1. As a result, Kt of the voice coil 100 was improved by 10%.

Next, the feature of the voice coil 100 will now be described qualitatively. The projecting portions 103 and 105 of the voice coil 101 act not only as out-of-plane forces but also as weight on the AHSA 15. That is, it can be presumed that the weight of the projecting portions 103 and 105 in the voice coil 101 exerts an oscillation energy on the AHSA 15 and acts as an obstacle to damping. However, there are no such coil portions for the voice coil 100. Furthermore, the coil spacing in a direction perpendicular to the coil axis on the rear end side in the coil plane is small in the circular voice coil 100 and therefore the coil support can also be made small, thus permitting an increase in rigidity of the AHSA 15. As a result of an increase in rigidity and decrease in weight of the AHSA 15, a resonance frequency of the AHSA 15 increased. Consequently, it was possible to make the oscillation amplitude small and further improve the positioning accuracy. Further, since the circular coil is easy to fabricate, it was possible to shorten the manufacturing time and reduce the cost.

Figure 6:
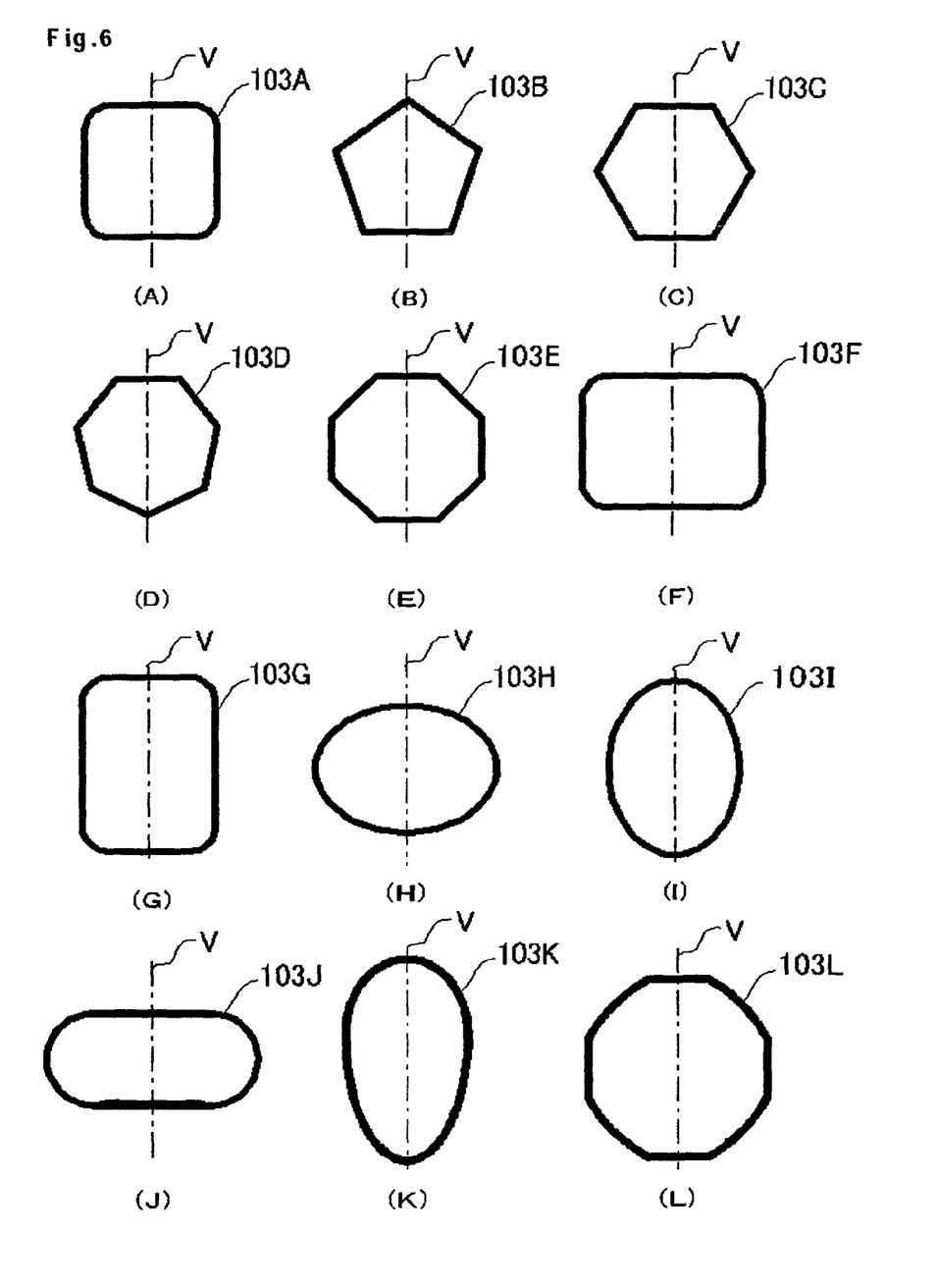
FIG. 6 illustrates shapes of a voice coil according to additional embodiments of the present invention.

FIG. 6 illustrates voice coil shapes according to other embodiments of the present invention. Voice coils 103A to 103L shown in FIG. 6(A) to (L) indicate shapes in coil planes, being substantially symmetric in shape with respect to the coil axis V. Any known shaped sectional shape of coil may be used. Voice coils 103A to 103E are in regular polygonal shapes. The voice coil 103A is a square, 103B is a regular pentagon, 103C is a regular hexagon, 103D is a regular heptagon, and 103E is a regular octagon.

If the number of a side of a regular polygon is increased, the regular polygon will finally be transformed in a shape of circle and therefore all of voice coils having regular quadrangle or more polygon shapes are included in the scope of the present invention. A voice coil having a regular polygonal shape usually includes a curved portion in each connection between adjacent sides, which curved portion is produced during manufacture, and such a shape is also included in the scope of the present invention. The voice coils 103F and 103G are in rectangular shapes which are short and long respectively in the direction of the coil axis V. The voice coils 103H and 103I are in elliptic shapes which are short and long respectively in the coil axis direction. The voice coil 103J is in a shape comprising two rectilinear portions perpendicular to the coil axis V and semicircular portions contiguous to ends of the rectilinear portions.

The voice coil 103K is in an oval shape. The voice coil 103L is in a shape comprising rectilinear portions perpendicular to the coil axis V, rectilinear portions parallel to the coil axis V, and curved portions contiguous to those rectilinear portions. The voice coil 103L is longer in curved portions than the voice coil 103A. In the voice coil 103L, the rectilinear portions may be made different in length or may be arranged at any other angles than in the parallel and perpendicular arrangements to the coil axis V. Voice coil shapes included in the scope of the present invention are not limited to the illustrated ones. For example, shapes capable of being easily inferred from the illustrated ones, such as an elongated shape in the coil axis direction of the voice coil 103J, are included in the scope of the present invention. Further, even asymmetric shapes resulting from slight deformation for some reason or other during manufacture are also included in the scope of the present invention insofar as they bring about the effects of the present invention. Various voice coil shapes included in the scope of the present invention have thus been illustrated. However, a suitable voice coil shape can be selected according to purposes, for example, according to the purpose that the degree of reverse torque created in the vicinity of the inner crash stop or the outer crash stop and the torque efficiency in the vicinity of the coil axis are to be balanced, or according to the purpose that a desired torque characteristic is to be obtained relative to a pivotal position of the AHSA 15, or according to the purpose that the relation to the voice coil magnetic circuit is to be optimized.

Figure 7:
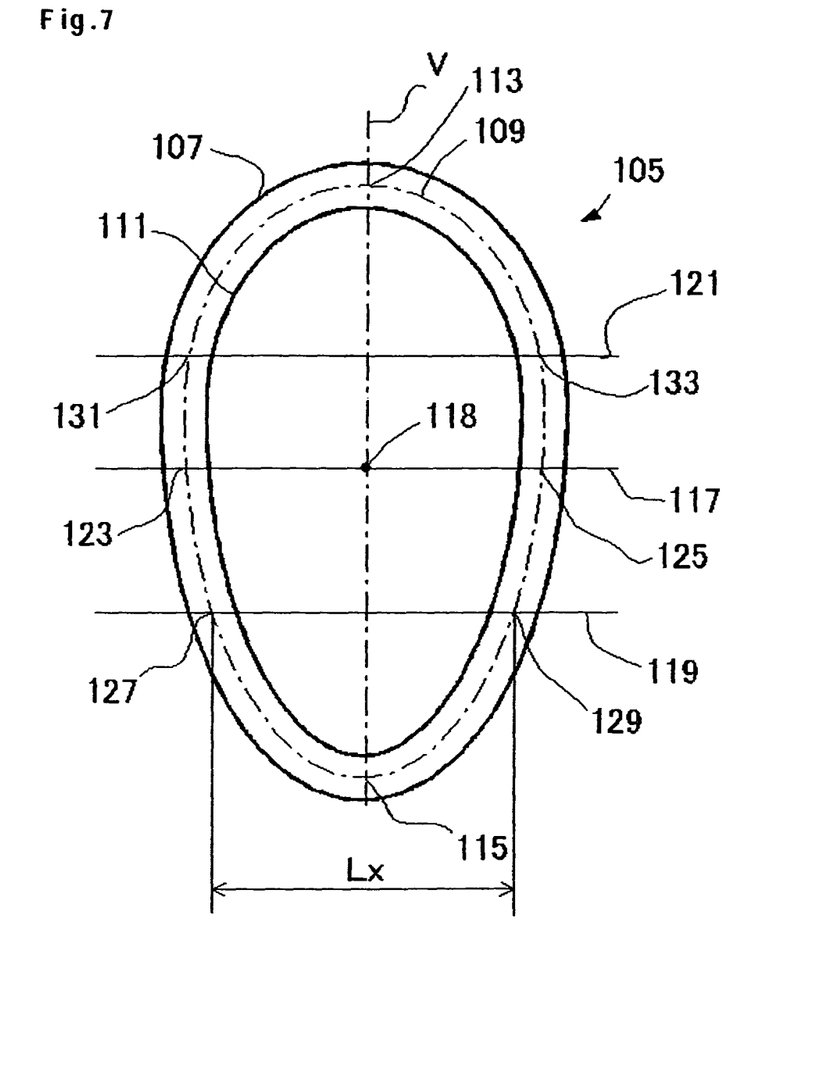
FIG. 7 illustrates in a generalized manner a voice coil symmetric about a coil axis.

FIG. 7 illustrates the scope of the present invention in a generalized manner in connection with a voice coil which is symmetric about a coil axis. A voice coil 105 has a symmetric shape in a coil plane thereof with respect to a coil axis V. The voice coil 105, in the coil plane thereof, has a coil width defined by an outer periphery 107 and an inner periphery 111. The center of the coil width is represented by a line 109. The coil axis V and the line 109 cross each other at an intersecting point 113 on a front end side of the voice coil 105, i.e., on the side close to the pivot shaft, and cross each other at an intersecting point 115 on a rear end side of the voice coil. A perpendicular line 117 is perpendicular to the coil axis V and passes through a middle point 118 between the intersecting points 113 and 115. The perpendicular line 117 intersects the line 109 at intersecting points 123 and 125.

A perpendicular line 119 is parallel to the perpendicular line 117 and intersects the coil axis V between the intersecting points 113 and 115. The perpendicular line 119 intersects the line 109 at intersecting points 127 and 129, providing a coil spacing Lx between the intersecting points 127 and 129. The voice coil shape included in the scope of the present invention can be said to be a shape wherein the perpendicular line 119 providing the longest coil spacing Lx intersects the coil axis V on the front end side relative to the perpendicular line 117, i.e., at the position of the middle point 118, or at a position closer to the intersecting point 113 relative to the middle point 118. In this embodiment, the perpendicular line 119 providing the longest coil spacing Lx can be obtained at the position of a perpendicular line 121, at which the coil spacing Lx is defined by points 131 and 133. The coil axis V may coincide with the center line CL in the longitudinal direction of the AHSA 15, or may coincide with a line joining the pivot shaft 17 and the middle point 118, or may coincide with a line joining the head and pivot shaft 17. Further, the coil axis V may lie on a line close to those lines.

Figure 8:
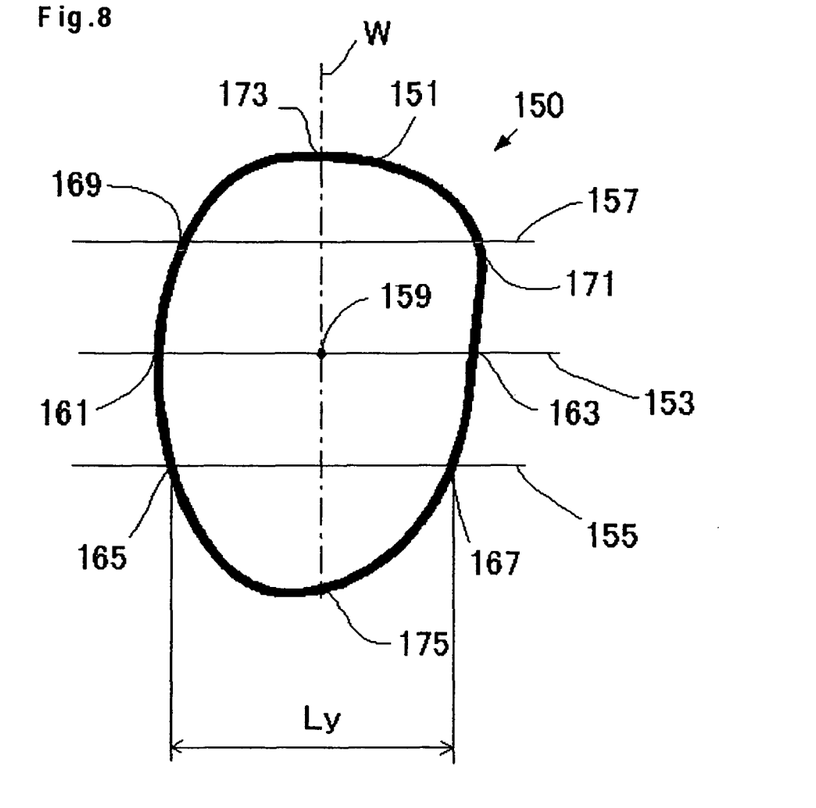
FIG. 8 illustrates in a generalized manner a voice coil asymmetric about a coil axis.

FIG. 8 illustrates the scope of the present invention in a generalized manner in connection with a voice coil which is asymmetric about a reference line. A voice coil 150, in a coil plane thereof, is formed in an asymmetric shape about a reference line W. A center line in the coil width of the voice coil shown in FIG. 7 is typically depicted as line 151. When coil portions of the voice coil 150 are considered to be a subdivided, lumped mass system, a point 159 represents a centroid position of the lumped mass system, which position corresponds to the center of mass of the voice coil 150.

The reference line W is a line joining the center of gravity 159 and the center of the pivot shaft 17 or a line joining the center of gravity 159 and the head. The reference line W may be a longitudinal center line of the AHSA 15 or a line passing through the head and the center of the pivot shaft 17. The reference line W intersects the center line 151 of the coil width at intersecting points 173 and 175. A perpendicular line 153 is a line passing through the center of gravity 159 and perpendicular to the reference line W. The perpendicular line 153 intersects the center line 151 of the coil width at intersecting points 161 and 163, providing a coil spacing Ly between the intersecting points 161 and 163. A perpendicular line 155 is an arbitrary line parallel to the perpendicular line 153 and intersecting the reference line W between the intersecting points 173 and 175. The perpendicular line 155 intersects the center line 151 of the coil width at intersecting points 165 and 167, providing a coil spacing Ly between the intersecting points 165 and 167. Thus, the voice coil shape included in the scope of the present invention can be said to be a shape wherein the perpendicular line 155 providing the longest coil spacing Ly intersects the reference line W on the front end side relative to the perpendicular line 153, i.e., at the position of the center of gravity 159, or at a position on the intersecting point 173 side relative to the center of gravity 159. In this embodiment, the perpendicular line providing the longest coil spacing Ly can be obtained at the position of a perpendicular line 157, at which the coil spacing Ly is defined as the distance between intersecting points 169 and 171.

In each of the voice coil 105 shown in FIG. 7 and the voice coil 150 shown in FIG. 8, the width on the rear end side is equal to or narrower than that on the front end side. This is reverse to the conventional sectorial shape, or the center of gravity of a lumped mass system lies on the front end side. As a result, the proportion of an out-of-plane force becomes smaller than that in the conventional sectorial voice coil and the proportion contributing as weight to the oscillation energy also becomes smaller. Thus, the same function and effect as in the foregoing circular coil can be exhibited.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A rotating disk storage device comprising:
   a rotating disk storage medium;
   an actuator head suspension assembly pivotable about a pivot shaft and having a head mounted thereon, said head being adapted to access said rotating disk storage medium;
   a voice coil attached to said actuator head suspension assembly; and
   a voice coil magnet which constitutes a voice coil motor in cooperation with said voice coil;
   wherein:
   the voice coil includes a perpendicular coil spacing along a perpendicular line to a coil axis of said voice coil,
   the coil axis is in line with the center of said pivot shaft, crosses said voice coil at a first intersecting point close to said pivot shaft and at a second intersecting point distant from said pivot shaft, and the perpendicular line intersects said coil axis perpendicularly at a point between said first and second intersecting points,
   the perpendicular coil spacing is longest when said perpendicular line lies on a middle point between said first and second intersecting points or lies between said middle point and said first intersecting point,
   said voice coil is formed symmetrically about said coil axis,
   said voice coil is formed in a circular shape in a coil plane thereof.

2. A rotating disk storage device according to claim 1, further comprising a retracting pin disposed near a center line of said actuator head suspension assembly.

* * * * *